Patented May 20, 1952

2,596,972

UNITED STATES PATENT OFFICE 2,596,972

NUTRIENT COMPOSITION FOR THE PREPARATION OF STREPTOMYCIN

William F. Allen, Decatur, Ill., assignor to A. E. Staley Manufacturing Company, Decatur, Ill., a corporation of Delaware No Drawing. Application December 30, 1947, Serial No. 794,802

2 Claims. (Cl. 195—80)

This invention relates to the provision of a novel nutrient composition useful for culturing microorganisms for the production of antibiotic substances, such as streptomycin, having particular reference to a composition comprising a combination of vegetable oil meal and inositol as essential ingredients.

A principal object of the invention is to provide a nutrient composition which, when used in the culturing of microorganisms, will stimulate the microorganisms to generate increased yields of substances which are desired to be obtained.

Another object of the invention is the provision of a nutrient composition which, when used in the culturing of microorganisms, stimulates the microorganisms to form desirable fermentation products at an increased rate, whereby increased yields of such products per unit time are produced.

An additional object of the invention is the provision of an improved nutrient composition which, when used in the culturing of microorganisms, so influences the course of fermentation as to avoid the production of undesirable substances which are deleterious and troublesome in the subsequent isolation and purification processes.

A further object of the invention is the provision of a nutrient composition which, when used in the culturing of streptomycin-producing microorganisms, stimulates the microorganisms to generate increased yields of streptomycin.

A still further object of the invention is the provision of an improved nutrient composition which, when used in the culturing of streptomycin-producing microorganisms, influences the course of fermentation in such a manner as to avoid the production of undesirable histamine-like bodies which are deleterious and troublesome in the subsequent isolation and purification processes.

Other objects of the invention will in part be obvious and will in part appear hereinafter.

The invention accordingly comprises a composition of matter possessing the characteristics, properties and the relation of components which will be exemplified in the composition hereinafter described and the scope of the application of which will be indicated in the claims.

In a biological process, as in any chemical process, increased efficiency in the transformation of raw material into the desired end product is of prime importance. Where the yield in such process is small and the cost of recovery of the desired product from a large proportion of waste material is high, the yield becomes a controlling factor in the cost of production.

In the production of antibiotic substances by microorganisms in present fermentation processes, the yield of these substances is only a small fraction of one percent of the weight of nutrient materials used in the culture media. Consequently, the desired substance in the spent culture medium must be concentrated and isolated from relatively large volumes of liquor. This is commonly done by means of selective adsorption or solvent extraction processes. In addition to this, the fermentation processes are relatively slow, requiring several days to provide a maximum yield of product. As a result of these limiting factors, large and numerous units of equipment are required to provide even small quantities of purified product from a single fermentation. This is the situation, for example, in the case of streptomycin production.

In the process for producing streptomycin, a suitable microorganism such as *Streptomyces griseus* may be cultured in an aqueous medium containing representative materials selected from three broad classes of the following essential ingredients:

(a) An organic nitrogen source, such as peptone, beef extract, yeast extract, corn steepwater, vegetable protein material such as soybean meal, casein, enzyme-converted proteins, grain fermentation residues, and the like.

(b) A carbohydrate, such as glucose, corn syrup, starch, modified starches, dextrins, soybean carbohydrate, lactose, maltose.

(c) A mineral supplement, such as sodium chloride, magnesium sulfate, ferrous sulfate, potassium phosphate, ammonium sulfate, potassium sulfate, calcium carbonate, etc., or combinations of these.

The concentrations of substances from these classes in the medium may be varied widely depending upon the combination chosen, but ordinarily varies between 0.5 percent and 2 percent, governed by the fermentation process being employed.

The culturing of microorganisms for the production of streptomycin either may be carried out by the surface-growth method or by the submerged-growth method. Both of these means have been employed in experimental work but in a commercial process the organism is usually grown by the submerged method in large aerated tanks.

The yield of streptomycin is affected by many factors. Foremost of these is the nutrient medium composition itself, which can vary in the nature, concentration and proportions of the individual components employed. The balance between the nitrogen, carbohydrate and mineral ingredients is very sensitive and a combination of protein and sugars which give good results with one mineral supplement might be almost worthless with a different mineral supplement or a different proportion of the same one. This situation is complicated by the presence in most naturally occurring proteins and carbohydrates of various mineral ingredients. Another factor influencing yield is the process of fermentation to be practiced, that is to say, the selection of the proper physical conditions. A medium that gives optimum results under one set of operating conditions may be inferior in another. Aeration, agitation, temperature, time and type of equipment are important variables.

Soybean meal, with suitable carbohydrate and mineral supplements, has proven to be one of the most desirable organic nitrogen sources because it gives relatively high yields of streptomycin. These increased yields, based on the weight of nutrient materials used, are still so low, however, that the production cost of streptomycin is undesirably high.

By "vegetable oil meal" is meant the residue obtained after the oil therein has been removed by such means as, for example, mechanical pressure or solvent extraction. To provide my novel composition, 100 parts of such meal may be mixed with 0.01 to 10 (preferably 1 to 5) per cent of inositol.

Soybean meal, or soybean protein, is preferred in practicing the present invention because of its availability, low cost, and the fact that it yields no histamine-like bodies when used as a nutrient composition in the culturing of *Streptomyces griseus* in the production of streptomycin.

Inositol (hexahydroxycyclohexane) is obtained by hydrolysis of phytic acid or its derivatives, such as phytin. Numerous procedures for accomplishing the hydrolysis, which involve heating the inositol ester with aqueous acid or alkali, or with water alone, are described in the chemical literature. Particular reference is made to the article by Bartow and Walker published in the Journal of Industrial and Engineering Chemistry, volume 30, pages 300 to 303 (1938).

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A nutrient composition for the growth of streptomycin-producing microorganisms, which consists essentially of soybean meal and, as a growth-promoting and streptomycin-production stimulating factor, 0.01 to 10% by weight of free inositol.

2. In the preparation of streptomycin by culturing streptomycin-producing microorganisms in an aqueous medium containing soybean meal as the primary source of organic nitrogen, the improvement comprising: adding to the medium as the growth-promoting and streptomycin-production stimulating factor, 0.01 to 10% by weight of free inositol, based on the weight of the soybean meal.

WILLIAM F. ALLEN.

REFERENCES CITED

The following references are of record in the file of this patent:

UNITED STATES PATENTS

| Number | Name | Date |
|---|---|---|
| 2,051,017 | Schwarz | Aug. 11, 1936 |
| 2,422,230 | Foster | June 17, 1947 |
| 2,433,989 | Moyer | June 22, 1948 |
| 2,461,922 | Rake | Feb. 15, 1949 |

OTHER REFERENCES

Levine: Compilation of Culture Media, Williams and Wilkins (1930), pages 222, 223.

Tatum: Annual Review of Biochemistry, vol. XIII (1944), Stanford Univ. Press, pages 668, 669.

Schopfer: Helvetica Chimica, v. XXVII, August 1, 1944, pages 1018, 1019, 1022, 1023.

Waksman et al.: Jour. Am. Pharm. Assn., XXXIV, November 1945, page 275.

Le Page et al.: Prep. of Streptomycin, J. Biol. Chem. 162, 1, January 1946, pages 163, 164.

McMahon: Jour. Bact., #47, April 1944, pages 400, 401.